United States Patent [19]
Partee et al.

[11] Patent Number: 5,752,309
[45] Date of Patent: May 19, 1998

[54] METHOD AND APPARATUS FOR PRECISELY DIMENSIONING POLE TIPS OF A MAGNETIC TRANSDUCING HEAD STRUCTURE

[75] Inventors: Charles Partee, Boulder, Colo.; James W. Getz, Hubbardston, Mass.

[73] Assignee: Quantum Corporation, Milpitas, Calif.

[21] Appl. No.: 663,839

[22] Filed: Jun. 14, 1996

[51] Int. Cl.⁶ ............................................. G11B 5/127
[52] U.S. Cl. ..................... 29/603.18; 216/22; 216/52; 216/66
[58] Field of Search .................. 216/21, 22, 38, 216/52, 53, 66; 156/345 B; 204/298.36; 29/603.15, 603.16, 603.18

[56] References Cited

U.S. PATENT DOCUMENTS

| | | | |
|---|---|---|---|
| 4,878,290 | 11/1989 | Masud et al. | 216/66 |
| 4,983,830 | 1/1991 | Iwasaki | 250/309 |
| 5,141,623 | 8/1992 | Cohen et al. | 216/22 |
| 5,212,609 | 5/1993 | Yuito et al. | 29/603.18 |
| 5,314,596 | 5/1994 | Shukovsky et al. | 204/192.2 |
| 5,413,953 | 5/1995 | Chien et al. | 216/38 |
| 5,452,166 | 9/1995 | Aylwin et al. | 360/126 |
| 5,456,798 | 10/1995 | Koumura et al. | 216/66 |
| 5,468,177 | 11/1995 | Kindler et al. | 451/364 |
| 5,541,411 | 7/1996 | Lindquist et al. | 250/309 |
| 5,566,075 | 10/1996 | Syouji et al. | 29/603.18 |
| 5,569,392 | 10/1996 | Miyoshi et al. | 216/60 |
| 5,578,342 | 11/1996 | Tran et al. | 216/22 |

*Primary Examiner*—R. Bruce Breneman
*Assistant Examiner*—Anita Alanko
*Attorney, Agent, or Firm*—David B. Harrison; Debra A. Chun

[57] ABSTRACT

A method and apparatus for processing a magnetic transducer which uses gallium ion beam milling to precisely define pole tip widths of the magnetic transducer. The gallium ion beam may be defocused to improve definition of the region which is damaged by gallium ion implantation. The precision pole tip widths provide a transducer that may record correspondingly precise track widths on a magnetic storage medium, such as a rotating disk. Subsequent to the ion milling process, the invention restores the magnetically conductive properties of the pole tip region, which may be degraded as a result of the ion milling process, by means of a lapping process.

15 Claims, 4 Drawing Sheets

METHOD AND APPARATUS FOR PRECISELY DIMENSIONING POLE TIPS OF A MAGNETIC TRANSDUCING HEAD STRUCTURE

CROSS REFERENCE TO RELATED PATENTS

This invention relates to the following patents all of which are assigned to the assignee of this application as of the date of filing: U.S. Pat. No. 5,157,570, entitled, "MAGNETIC POLE CONFIGURATION FOR HIGH DENSITY THIN FILM RECORDING HEAD" to Shukovsky et al.; U.S. Pat. No. 5,314,596, entitled: "PROCESS FOR FABRICATING MAGNETIC FILM RECORDING HEAD FOR USE WITH A MAGNETIC RECORDING MEDIA" to Shukovsky et al.; and, U.S. Pat. No. 5,468,177, entitled: "LAPPING FIXTURE FOR DISK SLIDERS" to Kindler et. al.

FIELD OF THE INVENTION

The invention relates generally to magnetic head manufacture, and more particularly to precisely dimensioning the pole tip region of a magnetic transducer structure using ion milling techniques, followed by lapping to remove implanted ions in order to restore desired magnetic properties.

BACKGROUND OF THE INVENTION

Figure 1:
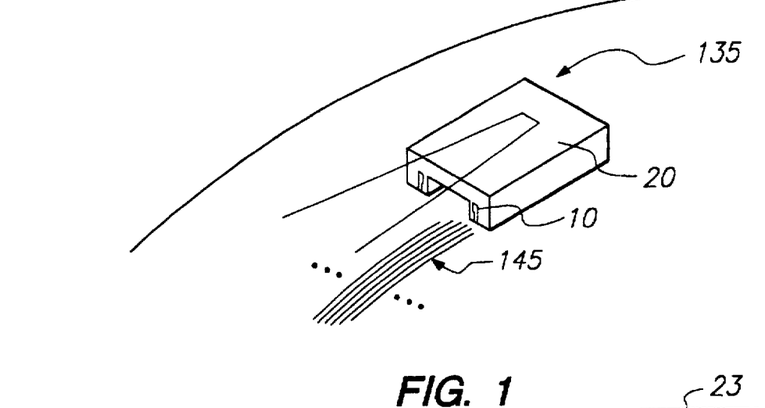
FIG. 1 is a highly diagrammatic view of a slider in a flying relationship over a rotating magnetic storage disk, the slider incorporating a magnetic transducer having a pole tip region machined in accordance with principles of the present invention.

By way of background, principal relevant features of an exemplary hard disk drive are considered. Referring to FIG. 1, a disk drive, in general, comprises an enclosed cavity. The cavity is atmospherically sealed and comprises a centrally located disk spindle rotated by e.g. an in-hub motor. Typically, at least one magnetic storage disk is mounted upon the spindle. A head stack assembly essentially positions at least one flying read/write slider at radial storage locations relative to a planar magnetic storage surface of the disk. The slider flies over the disk surface on a cushion of air created by the rotating disk such that an electromagnetic transducing relationship may be established and maintained between the slider's transducer and the disk. The arrangement described enables the slider to store and retrieve data to and from the disk surface, as a series of magnetic flux transitions. After the transitions have been written to and subsequently retrieved from the disk, channel electronics processes the data to a computing environment external to the housing of the drive by mean of an interface.

The dimensions of a slider's transducer can be a substantial factor in defining the number of data tracks that may be written onto a magnetic disk. Specifically, the effective electrical width of the pole tip region of the magnetic transducer is directly related to the physical width, as well as to other factors such a flying height above the rotating disk, in the case of flying head technology. In turn, the transducer's electrical width relates to the width of each track written to the storage medium. If the width of the pole tip region of the transducing member is made relatively smaller, a greater the number of tracks can be written in the same recording area. Therefore, the width of the pole tip region of a magnetic transducer is inversely related to track density of the magnetic storage medium.

Fabrication of sliders with magnetic transducers disposed thereon by thin film deposition techniques typically comprises the steps of alternately depositing a series of layers of a ferromagnetic flux-conductive material, such as a nickel iron alloy (NiFe) and non-magnetic electrically insulating material on to the top planar surface area of a prepared flat substrate of hard ceramic material called a "slider wafer". Next, a photoresist and patterning mask are positioned over and in a contact relationship with the first layer, whereby portions of said first layer may be exposed to light energy during a photolithographic patterning process. The exposed portions of the first layer are then removed by a chemical etch process. The unetched first layer of ferromagnetic material defines a first pole of the magnetic transducer.

Next, by repeating the deposition/patterning/etch steps, one or more layers of coils are formed directly over the first pole with a non-magnetic insulating layer separating the first pole and the coils. Finally, a second pole is defined over the last coil formed, completing the magnetic transducer structure. The width of the second pole is made very slightly smaller than the first pole to account for process tolerance deviations.

As formed, slider wafers generally comprise a matrix of magnetic transducers evenly spaced thereon. After transducer matrix formation, the slider wafer is sliced into rectangular bars such that each bar contains a row of unseparated individual transducers on one face thereof. Another face of the rectangular slider bars is shaped by lapping, sawing, ion etching, and/or ablative (laser etch) processes into contoured air bearing surfaces (ABS) at each slider location, the particular contour determining "flying characteristics" and not particularly pertinent to an understanding of the present invention. As formed, each slider body is aerodynamically dimensioned to fly the magnetic transducer over the rotating magnetic data storage disk at a predetermined altitude (one to several micro-inches) and orientation.

The first and second poles (collectively: the poles) of the magnetic transducer are substantially aligned and superimposed on top of each other with a number of coils therebetween, and with a narrow magnetic gap layer between the poles. The coils are positioned within a yoke region of the transducer, wherein the yoke region is formed opposite the pole tip region. During write operations, a write current is applied to the coils, and a magnetic flux field produced by the write current is directed into the poles and momentarily polarizes them in a predetermined magnetic field orientation, so that an intense magnetic flux field is created between the insulated poles. This field changes polar alignment of magnetic domains of the magnetic medium adjacently passing by.

During read operations, the magnetic transducer senses changes in the magnetic flux polarization previously written onto the magnetic storage medium. When the transducer passes over an change of magnetic polarization recorded on the magnetic medium a minute current flow is induced in the coils of the transducer. This minute current is amplified and processed into digital information by read channel electronics and is ultimately delivered to the computing environment requesting the readback operation.

A principal limitation of current transducer fabrication methods lies in limited size definition of the pole tip region of the magnetic transducer. Specifically, currently available photolithographic techniques for defining pole dimensions (in particular the pole tip width) are physically limited to pole tip widths of approximately 4 microns for inductive magnetic transducers, and are limited to pole tip widths of approximately 2 microns for inductive write/magnetoresistive read transducers. Moreover, process tolerance variations using photolithographic techniques to define pole tip widths are on the order of 0.2 microns. By way of example, a wafer having transducers with 4 micron pole tip widths may actually have pole tip widths ranging from 3.8 microns to 4.2 microns. The process variation of approximately 0.2 microns, however, does not decrease in proportion to the width of the pole tips. Therefore, process tolerance variations have become increasingly pronounced as pole tip dimensions are reduced e.g. down to the 2 micron range. Consequently, the inability to control pole tip processing variations results in transducing heads with pole tip width variations which record tracks having similarly varying track widths, thereby limiting overall track density and storage capacity of the magnetic storage device.

Figure 6A:
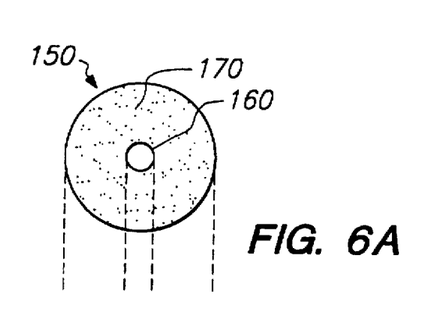
Figure 6B:
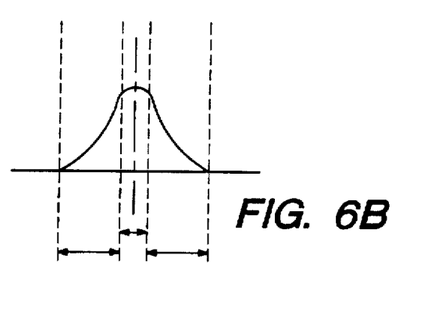

Conventional ion milling processes have employed a high intensity beam 150 as depicted in FIGS. 6(a) and 6(b). The high energy ion beam 150 comprises a high energy focal point 160 or spot that has a preferred diameter on the order of approximately 0.02 microns. The high energy spot 160 is the principal portion of the beam 150 that is used to remove material from a predefined target area of the workpiece. However, the beam 150 is also comprised of a lower intensity halo or penumbra 170 that essentially surrounds the high intensity spot 160. This halo region 170 has resulted in unwanted implantation of milling ions into the unmilled residue structure. Implantation of milling ions, such as gallium ions, into pole tip regions of head structures has produced pole tips having degraded magnetic transducing properties. Thus, a hitherto unsolved need has remained for a method for employing ion milling of pole tips to standardized dimensions without the drawbacks associated with implanted ion residues and degraded magnetic properties.

SUMMARY OF THE INVENTION

In accordance with principles of the present invention, a method enables more precise definition of pole tip dimensions of a magnetic transducing member in a manner overcoming limitations and drawbacks of the prior art.

An advantage of this method is the ability to define smaller pole tip widths within controllable tolerances than has heretofore been possible using more conventional photolithographic patterning techniques.

Another advantage of the present invention is that its practice enables a controlled reduction of pole tip width of a magnetic transducer which thereby records tracks at an increased track density on a magnetic storage medium, such as a rotating disk or moving tape.

In accordance with principles of the present invention, after a magnetic transducer has been formed, a controlled gallium ion beam under computer control is used to further micro machine and define the pole tip region of the transducer. One consequence of gallium ion machining is implantation of ions into the pole tips. Since gallium ions implanted in typical pole materials, such as a nickel iron alloy (NiFe), form a material with undesirably reduced magnetic properties, the pole tip region at the ABS of each transducer is further subjected to a single slider ABS lapping process. The lapping process removes a surface layer of the pole tip region having a relatively high concentration of implanted gallium ions. After the single slider lapping process, the precisely machined pole tip nickel iron region manifests restored desirable magnetic properties. In one aspect of the present invention, the gallium ion beam is controllably defocused to reduce the depth of gallium ion implantation into the pole tip region of each transducer, thereby limiting the depth of material removal.

As one facet of the invention, a method for precisely dimensioning pole tips of a magnetic transducing head comprises the steps of:

forming an array of magnetic transducing heads on a wafer substrate, dividing the substrate into rows of sliders, each slider row having at least one magnetic transducing head having a pole tip region of generally aligned, overlying pole tips, imaging a region of the pole tips by rapidly scanning an energetic beam of ions over the pole tip region and detecting secondary particle emission from the pole tip region as the image information, performing pattern recognition upon the image information to mark orientation and dimensions of the pole tips, and to determine regions of pole tip material removal to achieve precise dimensioning thereof, ion milling the pole tips to precise dimensions by redirecting the energetic ion beam toward the regions of pole tip material removal to remove said material by ion milling, wherein the imaging and milling steps cause milling ions undesirably to become implanted into a thin layer of the pole tips, separating the slider row into individual sliders, including the slider having the at least one magnetic transducing head, and performing a single slider lapping operation upon said slider to remove the thin layer of the pole tips implanted with milling ions.

Accordingly, one general object of the present invention is to provide a method for more precisely dimensioning pole tips of a magnetic transducer head using ion milling without unduly degrading magnetic transducing properties of the pole tips.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the drawings:

FIG. 2 (a) is an enlarged isometric view of the FIG. 1 slider showing two magnetic transducers formed on the rear face, and having their pole tip regions extending to the trailing edge of the air bearing surface.

FIG. 2 (b) is an enlarged bottom plan view of the air bearing surface and the pole tip regions of the FIG. 2 (a) slider structure.

FIG. 3 (a) is an enlarged cross sectional, and diagrammatic view of one of the FIG. 2(a) magnetic transducers.

FIG. 3 (b) is a top plan view of the FIG. 3 (a) transducer.

FIG. 5 (a) is an enlarged air bearing view of the pole tip region of the FIG. 3 (a) transducer.

FIG. 5 (b) is the FIG. 3 (a) view of the pole tip region with predefined micro machining target areas enclosed by dashed lines indicating areas of material removal by a focused ion beam in accordance with principles of the present invention.

FIG. 5 (c) shows the FIG. 3 (a) pole tip region following material removal by a computer controlled, focused ion beam.

FIG. 6 (a) is a greatly enlarged cross section of a focused gallium ion beam illustrating areas of relative ion concentrations.

FIG. 6 (b) is a corresponding graph of an energy spectrum of the beam shown in FIG. 6 (a).

FIG. 7 (a) is a cross section of the FIG. 6 (a) ion beam after being slightly defocused while remaining at the same overall ion concentration and intensity.

FIG. 7 (b) is a corresponding graph of an energy spectrum of the slightly defocused ion beam shown in FIG. 7 (a).

DETAIL DESCRIPTION OF A PREFERRED EMBODIMENT

Referring to FIGS. 1–7, a preferred embodiment of the present invention set forth herein is a method of processing a magnetic transducer 10 for use e.g. with a disk drive storage system. A feature of the present invention is realized by using a high intensity focused gallium ion beam in order to precisely dimension the pole tip region 30 of a magnetic transducing member 10.

The method of manufacturing the magnetic transducing member in accordance with the present invention initially includes a series of conventional wafer and slider bar processing steps as illustrated in commonly owned U.S. Pat. No. 5,314,596, entitled: "Process for Fabricating Magnetic Film Recording Head For Use With A Magnetic Recording Media" to Shukovsky et al. the disclosure thereof being incorporated herein by reference. These conventional steps essentially include:

forming a series of substantially aligned layers of ferromagnetic material onto the top planar surface of a substrate, wherein each successive layer has a non-magnetic insulating material disposed therebetween disposing a first layer of ferromagnetic material over the major surface of a substrate dimensioning the first layer through a photolithographic process to form a first pole. The photolithographic process may include coating a layer of photoresist material, positioning a mask over the photoresist layer, exposing unmasked portions of the layer to ultraviolet light, and removing unwanted portions of the photoresist and underlying ferromagnetic layer with a chemical etch. The patterned portions of the first layer remaining after the etch process step define first poles of the array of magnetic transducers.

The aforementioned process steps are repeated with a mask substitution in order to form at least one magnetic coil directly over the first pole at each transducer location. The last masking step defines a second pole, such that the first and second poles of each transducer are substantially aligned and have at least one coil formed and connected therebetween.

Figure 2A:
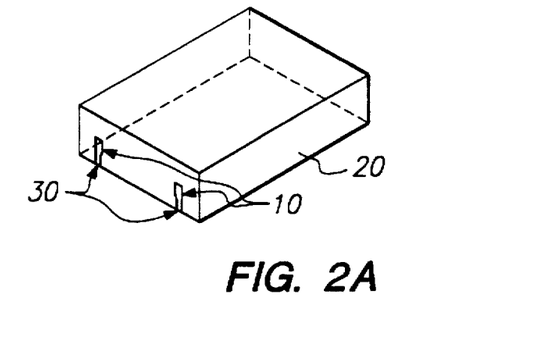
Figure 2B:
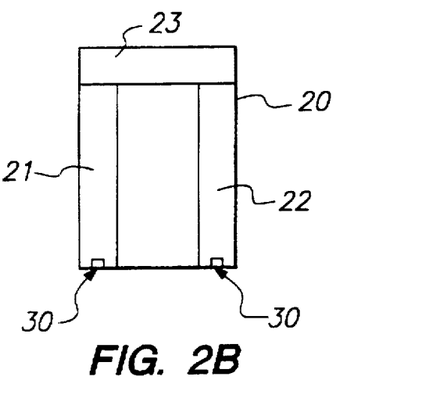

As shown in FIGS. 1–2, two transducers 10 are typically formed on each slider 20, one at a trailing edge of a left rail 21, and one at a trailing edge of a right rail 22. As formed, the slider 20 also typically includes a taper region at a leading edge (i.e. slider edge leading into airflow). By forming two transducers 10, rather than one, on each slider several advantages follow. First, upfacing sliders may have transducers vertically aligned with downfacing sliders in a headstack assembly. Second, by forming two transducers per slider, a quality control screening process may identify which one of the two transducers 10 is functional or has superior transducing characteristics, thereby screening each slider and achieving greater yields in the manufacturing process. Some head designs and fabrication processes, such as very small heads, and/or heads incorporating magnetoresistive read elements in the magnetic gap between the pole tip regions, do not lend themselves to formation of dual transducer elements on each slider, and in those examples, only one transducer is formed for each slider.

Figure 3A:
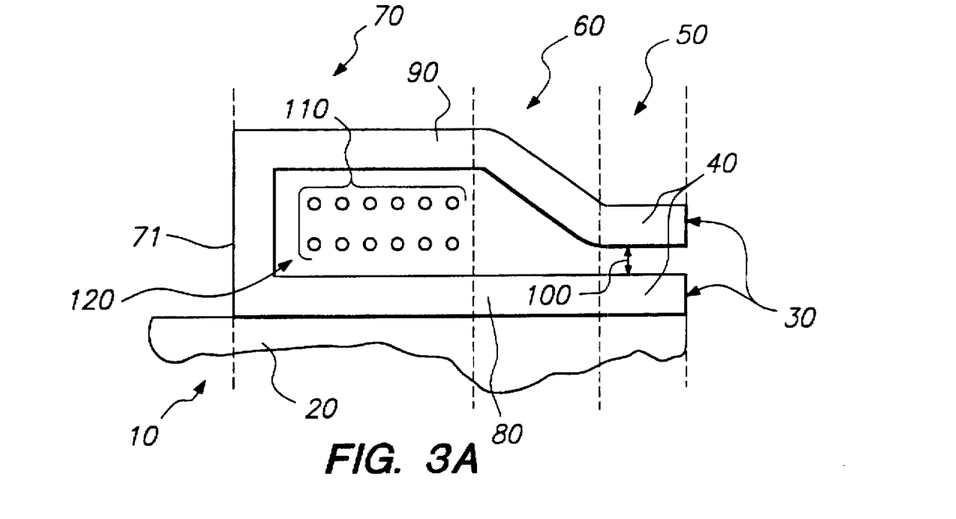

Referring now to FIG. 3 (a), as formed on the slider 20, each magnetic transducer 10 essentially comprises a first portion 50, second portion 60, and a third portion 70. The first portion 50 comprises an elongated throat 40 extending outwardly from the remainder of the transducer 10, wherein an outwardly facing end of the throat 40 defines a pole tip region 30. Since the throat portion 40 is comprised of a first pole 80 and an overlying second pole 90 extending along a parallel path and separated by a substantially constant magnetic gap 100 therebetween, the pole tip region 30 comprises outer pole faces of the first pole 80 and second pole 90, and the face of the magnetic gap material (non-ferromagnetic layer material forming gap 100).

Figure 4:
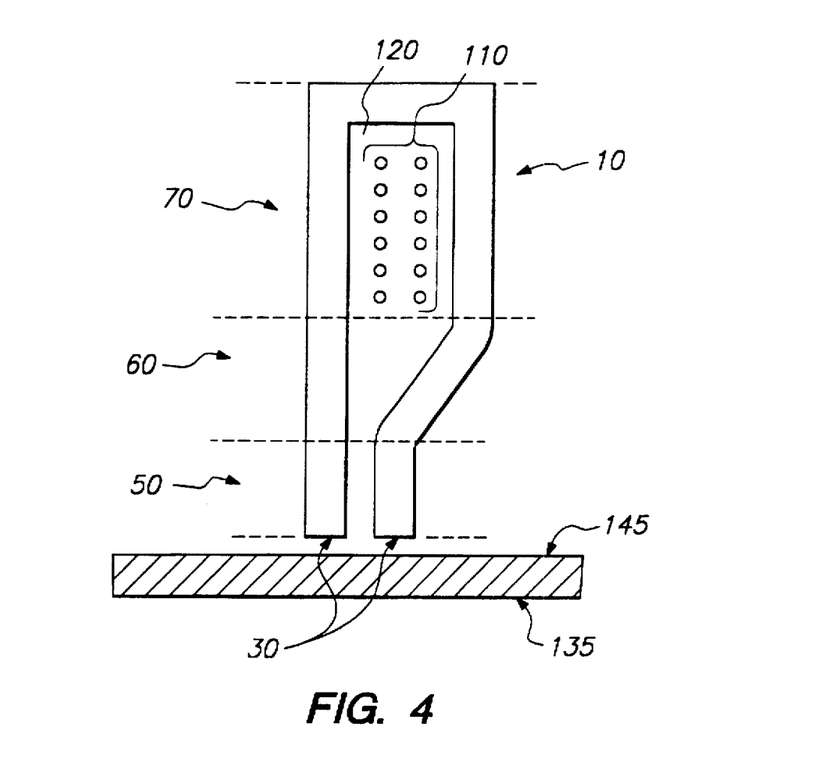
FIG. 4 is a diagrammatic view showing the FIG. 3 (a) transducer in a transducing relationship with a relatively moving magnetic storage medium, such as the FIG. 1 rotating disk.

As illustrated by FIG. 4, the pole tips at pole tip region 30 are the primary electromagnetic circuit interface between the transducer 10 and the moving magnetic storage medium, such as the rotating hard disk 135 shown in FIGS. 1 and 4. Traversing along an imaginary axis of transducer 10 as shown in FIG. 3(a) from the pole tips 30 inwardly towards second portion 60 thereof; the second pole 90 diverges away from the first pole 80 but reconverge together at a back wall portion 71 in region 70. The region 70 of the transducer 10 as bounded by the first pole 80, back wall 71 and the second pole 90, defines a magnetic yoke structure 120 that overlies a number of coil windings or turns 110 disposed therein in one or more planar layers.

Figure 3B:
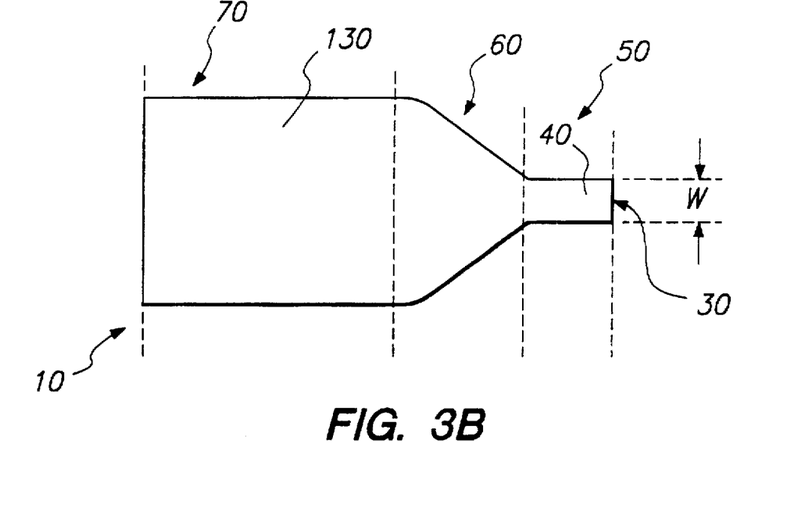

As perhaps best seen in FIG. 3(b), the pole tip region 30 of the magnetic transducer 10 substantially defines a width W which governs the width of each data track 145 written on the magnetic storage medium, e.g. disk 135. Therefore, in accordance with one aspect of the present invention, an ion milling process, such as a high intensity focused gallium ion beam, is used to further dimension the pole tip region 30 to a width of e.g. two microns or less. Correspondingly, data tracks 145 written on the magnetic disk 135 with magnetic transducers 10 formed by the methods described herein will then have more precisely controlled track width dimensions W.

Figure 8:
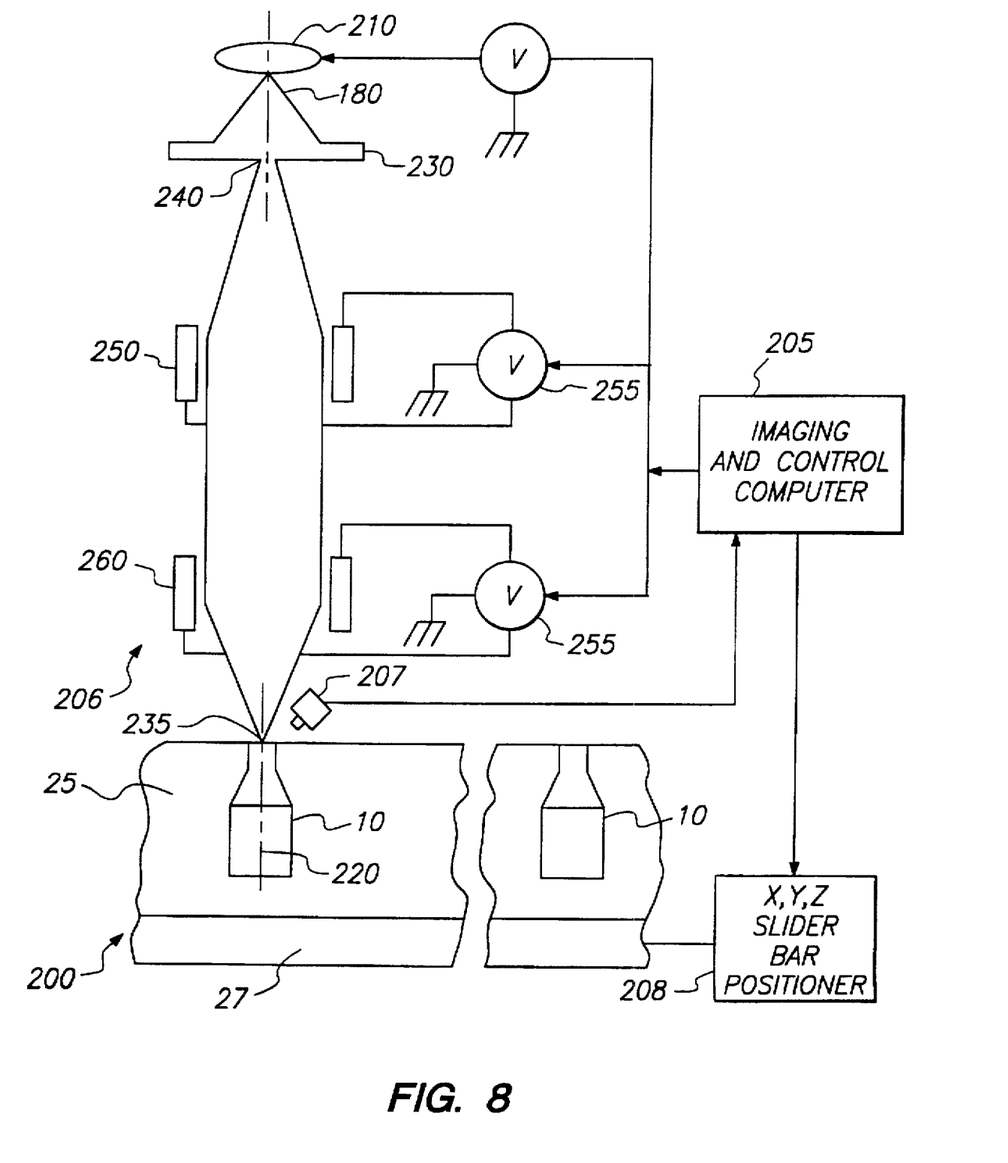
FIG. 8 is a functional schematic diagram in elevation and section of an ion beam generating apparatus for generating a gallium ion beam for machining pole tip regions of magnetic transducers shown mounted on a greatly enlarged slider bar and fixture and incorporating aspects of the present invention.

A computer controlled ion milling machine 200 for carrying out the method of the present invention is shown in FIG. 8. The milling machine 200 includes an imaging and control computer 205, a beam focus and acceleration apparatus 206, an image detector 207 and an x,y,z dimension slider bar positioner 208 The acceleration apparatus 206 includes a gallium source 210 emitting e.g. a 50 kilo-volt (50-kV) gallium ion beam with e.g. a beam current of 26-nano-amperes (26-na). The gallium ion beam propagates along a central optical axis 220 and passes through an aperture 240 of a collimator 230 One preferred dimension of the aperture 240 is 400-microns. The beam exiting the aperture 240 continues along the central optical axis 220.

A first pair of electromagnetic lenses 250 and a second pair of electromagnetic lenses 260 are positioned along the optical axis 220 and between beam collimator 230 and a target area 235. A computer controlled voltage source 255 applies control potential to the first and second electromagnetic lenses 250 and 260 in order to control beam focus at the target area 235 One preferred lens voltage, in accordance with the present invention, is −120 volts.

Specifically, a method in accordance with principles of steps. Referring to FIG. 8, the first step is registering a slider bar 25 carried upon a slider bar fixture 27 at a nominal set up position in a three axis computer controlled positioner 208, controlled by the computer 205. The slider bar 25 has been separated from the slider wafer, and mounted on the slider bar fixture 27. In one example, the slider bar 25 includes e.g. 28 pole tip regions 30 to be trimmed in accordance with the principles of the present invention. The initial set up has the air bearing surfaces of the undivided sliders facing the ion beam in the FIG. 8 view.

Figure 7A:
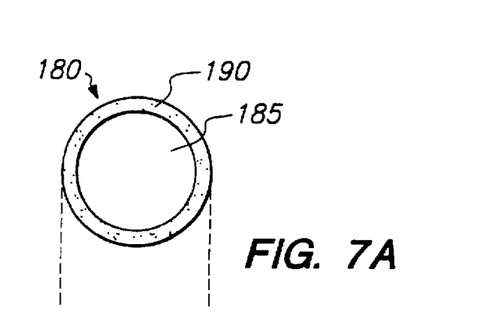
Figure 7B:
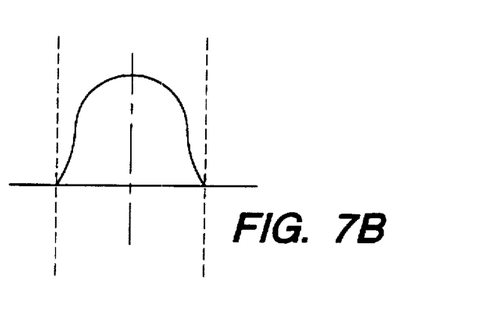

The second step is that the computer 205 turns on the accelerator 206, and the pole tip region 30 of the magnetic transducing member 10 is rapidly scanned with a computer controlled, slightly defocused gallium ion beam 180 (the defocused beam 180 is shown in FIGS. 7(a) and 7(b)). This initial rapid scanning step uses beam deflection technology and is carried out for the purpose of imaging the pole tip region 30 while minimizing edge erosion and implantation of ions into the pole tip structure being scanned. Ideally, a high intensity ion beam 150 as shown in FIGS. 6(a) and 6(b) would be used during the brief imaging step, because it produces a better quality image, and the defocused beam 180 as shown in FIGS. 7(a) and 7(b) would be used during the subsequent milling steps. The defocused beam 180 is preferred for milling because defocusing increases the spot size that performs most of the material removal, and the reduced penumbra region 190 causes less rounding of the pole tips and implantation damage at the edge areas. However, practical ion beam sources, such as the beam source 206 cannot presently be switched and settled sufficiently rapidly by the computer 205 in a production line pole tip trimming process to enable switching between narrow spot 150 for imaging, and wider spot 180 for milling, each pole tip region 30.

The image detector 207 is located about five millimeters away from the target area 235 at an angle of reflection (scattering angle). The detector 207 produces an image from secondary particle emission from a target at the target area 235, such as the pole tip region 30 of a slider 10. In the FIG. 5(a) example, the background surrounding the pole tips is essentially comprised of aluminum oxide, and this adjacent background material appears as "white" to the image detector 207. On the other hand, the nickel iron alloy pole tips 40 appear "dark" to the image detector 207, so that the pattern being sought during the imaging step is two dark boxes, one on top of the other, and this pattern is detected by the computer 205 and leads to the computerized step of defining ideal material removal boxes 140 around the pole tips 40, as shown in FIG. 5(b).

Pixels generated by the image detector 207 are collected into a memory of the computer 205 and are used to determine pole tip dimensions and orientation. Occasionally, the pixel image data is unreadable, because of machine vibrations, or other extraneous influences. In that case, the computer causes another image to be taken.

Figure 5A:
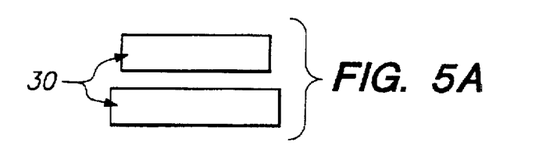
Figure 5B:
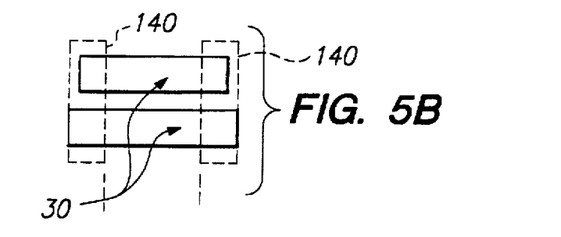
Figure 5C:
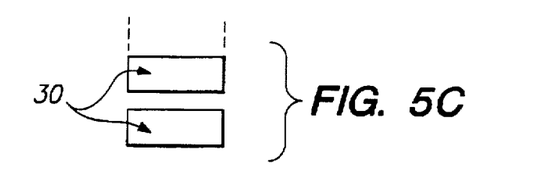

Once satisfactory image data is obtained of the pole tip region 30, the pole tip dimension and orientation information is then processed within a software-driven simple pattern recognition process which determines target areas 140 of the pole tip region 30 as the two dark boxes shown in FIG. 5(a). Bounded areas 140 for material removal are illustrated in FIG. 5(b).

The next step is ion milling for material removal. The material removal within the predetermined target area 140 is then most preferably achieved by slowly rastering the slightly defocused gallium ion beam 180 over the target area 140. The duration of time required for the gallium ion beam 180 to strike the target area 140 with one preferred dosage of ions equivalent to 6-nano-coulomb per square-micron or $$\frac{6nc}{sq.mic.},$$

for removing 1-square-micron of material therefrom, may be calculated according to the following equation:

$$t \cong \frac{6nc}{26na} \cong .23$$

seconds per square micron.

Each target area 140, as shown in FIG. 5b, comprises approximately 40-square-microns. Accordingly, removing material therefrom to a depth of 1-micron requires the gallium ion beam 180 to strike the surface for t=(0.23)(40) =9.23 seconds.

Therefore, the ion beam accelerator 206 may be used to target the pole tip region 30 of a magnetic transducer 10 such that the pole tip region 30 may be dimensioned to have a controlled width W in a precision controlled manner, with the drawbacks of slight pole tip edge erosion and implantation of some gallium ions into the remaining pole tip areas.

The halo 190, as shown in FIG. 7, may be reduced by defocusing the beam; however, the halo 190 cannot be completely eliminated. During material removal from the target area 140 using the focal point 185 of the slightly defocused beam 180, a portion of the beam's halo 190 overlaps onto the surface area of the pole tip region 30 of the transducer 10. The low energy halo 190 does not contain sufficient power to cause significant material removal from the surface of the pole tips 30 in appreciable amounts. However, the implantation of accelerated gallium ions with magnetic materials such as a nickel iron alloy (NiFe) results in a non-magnetic material such as a gallium-nickel-iron. Depending upon the concentration of ions implanted, the implanted magnetic pole tip material has less desirable magnetic transducing properties than unimplanted nickel-iron pole tip material.

Each head 10 on the slider bar 25 is imaged and machined individually, first by the imaging and pattern recognition steps and second by the machining step. One pole tip region 30 has been machined, the computer 205 causes the positioner 208 to step to the next nominal slider position along the bar 25, and the foregoing imaging/machining steps are repeated. Head functionality and quality screening is performed before the pole tip machining operation, so that if there are defective heads on the slider bar 25, the computer 205 already has recorded this information, and automatically skips over any defective heads, to avoid useless machining of scrap material. After all of the good transducers 10 on the slider bar 25 have been processed at the ion milling station 200, the slider bar 25 is removed and divided into individual sliders 20.

At face value, the pole tip region 30 of the transducer 10 would achieve desirable pole tip 30 widths with minute dimensions such as, e.g. 2 microns or less, at the expense of slightly degraded magnetic properties of the pole tip 30 material. However, in a final process step the magnetically degraded portions of the pole tip region 30 of each ion machined transducer 10 may be lapped off using separated, single slider lapping techniques in accordance with the principles and teachings set forth in commonly owned U.S. Pat. No. 5,468,177, entitled: "Lapping Fixture For Disk Sliders" to Kindler et. al. the disclosure thereof being incorporated herein by reference. During this individual slider lapping process, a very thin outer layer of pole tip material at region 30 e.g. of a thickness of approximately 300 angstroms, is removed. By employing a single slider lapping step, the magnetically degraded portions of the pole tip region 30 of the transducing member 10 can be subsequently restored by means of the lapping process. If multiple images of the pole tip region 30 of a particular slider 10 were required, then the ion concentration may be higher for that particular slider, and a layer of greater thickness would be removed. This information is maintained by the computer 205 and transferred to the single slider lapping process for automatic process control. After the lapping step, the final result is a transducing member 10 with a precisely defined pole tip 30 width and with pole tips having restored magnetic properties.

While the precision dimensioning of pole tips has been illustrated within the context of manufacture of hard disk sliders and heads, those skilled in the art will appreciate that this method may be applied with equally superior results to other pole dimensioning processes, such as those employed in manufacture of tape heads. Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method for precisely dimensioning pole tips of a magnetic transducing head comprising the steps of:

forming an array of magnetic transducing heads on a wafer substrate, dividing the substrate into rows of sliders, each slider row having at least one magnetic transducing head having a pole tip region of generally aligned, overlying pole tips, imaging a region of the pole tips by rapidly scanning an energetic beam of ions over the pole tip region and detecting secondary particle emission from the pole tip region as image information, performing pattern recognition upon the image information to mark orientation and dimensions of the pole tips, and to determine regions of pole tip material removal to achieve precise dimensioning thereof, ion milling the pole tips to precise dimensions by redirecting the energetic ion beam toward the regions of pole tip material removal to remove said material by ion milling, wherein the imaging and milling steps cause milling ions undesirably to become implanted into a thin layer of the pole tips, separating the slider row into individual sliders, including the slider having the at least one magnetic transducing head, and performing a single slider lapping operation upon said slider to remove the thin layer of the pole tips implanted with milling ions.

2. The method set forth in claim 1 wherein the pattern recognition step is carried out by a programmed digital computer connected to receive the image information from an imaging detector of an ion accelerator.

3. The method set forth in claim 1 comprising a further step of defocusing the energetic ion beam to increase spot size and decrease penumbra region of the beam.

4. The method set forth in claim 3 wherein the energetic ion beam is defocused during the redirecting step for ion milling of the pole tips.

5. The method set forth in claim 3 wherein the energetic ion beam is defocused during the imaging step.

6. The method set forth in claim 1 wherein the slider rows comprise multiple heads, and wherein the imaging, pattern recognition and ion milling steps are sequentially carried out for each one of the multiple heads of a slider row.

7. The method set forth in claim 6 wherein the imaging, pattern recognition and ion milling steps are sequentially carried out under computer control, and further comprising a step of indexing a row of sliders from head position to head position during a process sequence.

8. The method set forth in claim 1 including the step of orienting the slider row toward the energetic beam such that the imaging and ion milling steps are carried out with pole tip ends facing the energetic beam.

9. The method set forth in claim 1 wherein the single slider lapping operation removes a layer of pole tip material having a thickness of approximately 300 angstroms.

10. A method of fabricating a magnetic transducing member comprising the steps of:

forming a series of substantially aligned layers of ferromagnetic material on a substrate, wherein each successive layer has a non-magnetic material disposed therebetween, each layer being disposed over the major surface and being dimensioned prior to the next successive layer being disposed thereon;

exposing the first layer to a photolithographic patterning process;

etching the photolithographically patterned regions of the first layer defining a first pole thereon;

forming at least one coil over the first pole;

forming a second pole over the coil;

scanning the pole tip region of the magnetic transducing member with a defocused ion beam for determining precise pole tip dimensions and orientation;

defining a target area on the pole tip region of the magnetic transducing member;

removing a first portion of material from the pole tip region of the magnetic transducing member defined by the target area with the defocused ion beam; and lapping a second portion of material from the pole tip region of the magnetic transducing member.

11. The method of fabricating a magnetic transducing member of claim 10 further comprising the steps of:

communicating the pole tip region dimension and orientation information to a computer controlled calculation process, and computing with the calculation process the target area on the pole tip region for material removal.

12. The method of fabricating a magnetic transducing member of claim 10 wherein the steps of scanning and removing are performed with an accelerated gallium ion beam directed toward the pole tip region of the magnetic transducer, such that gallium ions become implanted into pole tip region of the transducing member, thereby forming a layer of gallium nickel iron thereon; and lapping the pole tip region of the magnetic transducer for removing the gallium nickel iron layer.

13. An air bearing slider for a hard disk drive including an electromagnetic transducer having pole tips precisely dimensioned in accordance with a method comprising the steps of:

imaging a region of the pole tips by rapidly scanning an energetic beam of ions over the pole tip region and detecting secondary particle emission from the pole tip region as image information, performing pattern recognition upon the image information to mark orientation and dimensions of the pole tips, and to determine regions of pole tip material removal to achieve precise dimensioning thereof, ion milling the pole tips to precise dimensions by redirecting the energetic ion beam toward the regions of pole tip material removal to remove said material by ion milling, wherein the imaging and milling steps cause milling ions undesirably to become implanted into a thin layer of the pole tips, and performing a lapping operation upon said slider to remove the thin layer of the pole tips implanted with milling ions.

14. An air bearing slider manufacturing process for making an air bearing slider having an electromagnetic transducer with precisely dimensioned pole tips, the method comprising the steps of:

forming the transducer and the pole tips upon the slider, positioning the slider in a path of an accelerated ion beam generator, imaging a region of the pole tips by rapidly scanning a energetic beam of ions from the generator over the pole tip region and detecting secondary particle emission from the pole tip region as image information, performing pattern recognition upon the image information to mark orientation and dimensions of the pole tips, and to determine regions of pole tip material removal to achieve precise dimensioning thereof, ion milling the pole tips to precise dimensions by redirecting the energetic ion beam toward the regions of pole tip material removal to remove said material by ion milling, wherein the imaging and milling steps cause milling ions undesirably to become implanted into a thin layer of the pole tips, and performing a lapping operation upon said slider to remove the thin layer of the pole tips implanted with milling ions.

15. An air bearing slider manufacturing process for making a plurality of air bearing sliders, each slider having an electromagnetic transducer with precisely dimension pole tips, the method comprising the steps of:

forming an array of magnetic transducing heads on a wafer substrate, dividing the substrate into rows of sliders, each slider row having at least one magnetic transducing head having a pole tip region of generally aligned, overlying pole tips, placing a row of sliders such that one of the magnetic transducing heads has pole tips facing a path of an energetic beam of ions, imaging a region of the pole tips by rapidly scanning the energetic beam of ions over the pole tip region and detecting secondary particle emission from the pole tip region as image information, performing pattern recognition upon the image information to mark orientation and dimensions of the pole tips, and to determine regions of pole tip material removal to achieve precise dimensioning thereof, ion milling the pole tips to precise dimensions by redirecting the energetic ion beam toward the regions of pole tip material removal to remove said material by ion milling, wherein the imaging and milling steps cause milling ions undesirably to become implanted into a thin layer of the pole tips, repeating the steps of placing, imaging, performing pattern recognition and ion milling on other ones of the magnetic transducing heads of the row, separating the slider row into individual sliders, and performing a single slider lapping operation upon each of the individual sliders to remove the thin layer of the pole tips implanted with milling ions.

* * * * *